(No Model.)

H. B. KEIPER.
SCREW CUTTING PLATE.

No. 473,582. Patented Apr. 26, 1892.

Witnesses:
S Grant Johnston
Milton J Brecht

Inventor
Henry B. Keiper.
By
Dan'l H. Herr.
Attorney.

UNITED STATES PATENT OFFICE.

HENRY B. KEIPER, OF LANCASTER, PENNSYLVANIA.

SCREW-CUTTING PLATE.

SPECIFICATION forming part of Letters Patent No. 473,582, dated April 26, 1892.

Application filed September 9, 1891. Serial No. 405,229. (No model.)

*To all whom it may concern:*

Be it known that I, HENRY B. KEIPER, of Lancaster, in the county of Lancaster and State of Pennsylvania, have invented certain new and useful Improvements in Screw-Cutting Plates; and I do hereby declare the following to be a full, clear, and exact description of the invention, such as will enable others skilled in the art to which it appertains to make and use the same.

This invention relates to improvements in a stock and dies for cutting screw-threads on bolts, and they belong to that class in which a circular or ring collet holding two semicircular dies separated by two taper-headed guide-screws is held in place or kept from turning in a clamp-stock closed by means of a screw acting tangentially through lugs or ears projecting outward from the ends where said stock is cut open through a side of its central ring, or, in other words, the invention may be considered as an improvement on what is known to the trade as "The Lightning Screw-Cutting Plate."

The object of the invention is to produce an effective screw-cutting plate and to dispense with the four plug or set-screws through the periphery of the collet which now make the proper adjustment of the dies therein a tedious and difficult operation, requiring both skill and judgment.

The improvements consist, first, in providing the semicircular dies now in use with a slanting peripheral face, so that when their diametrical edges are placed together they form the frustum of a right cone; second, in making the collet ring form, giving to the upper portion of the hole therein, to a depth a little less than the thickness of the dies, a sloping inner face corresponding in size and shape to the conical form of the dies, while the rest of said hole is cylindrical in form and screw-threaded throughout; third, in fitting into the threaded portion of said hole a screw-plug or guide-disk adapted to support on its inner face the base of the dies before mentioned, and its outer or back face is provided with recesses to engage fingers or projections extending inward from the stock, which projections constitute the fourth element of these improvements.

The purposes of the invention are attained by the mechanism and devices illustrated in the accompanying drawings, in which similar letters refer to similar parts throughout the several views, in which—

Figure 2:
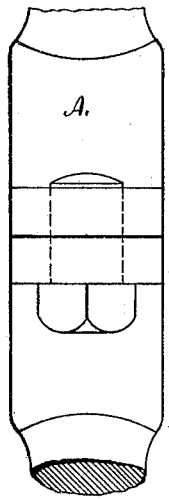
Figure 1:
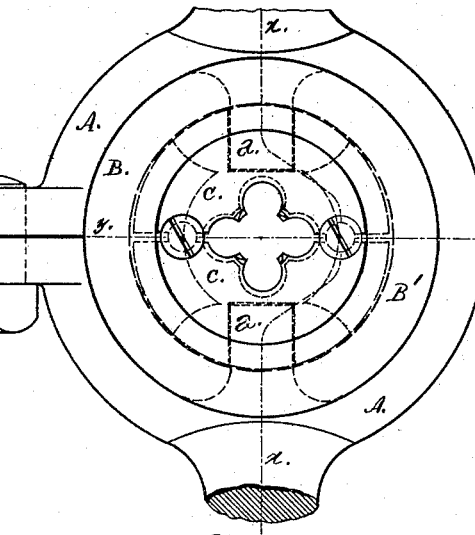
Figure 3:
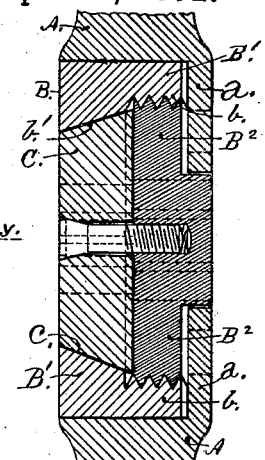
Figure 6:
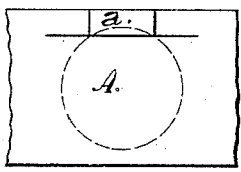
Figure 4:
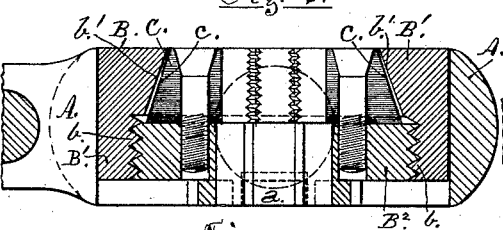
Figure 5:
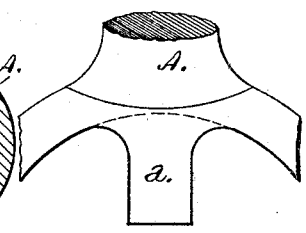
Figure 7:
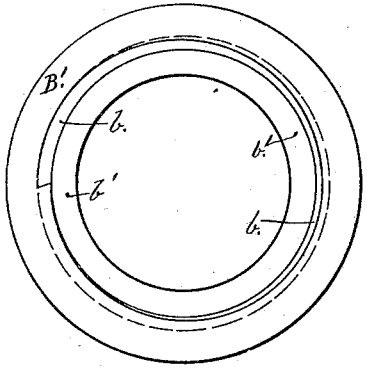
Figure 8:
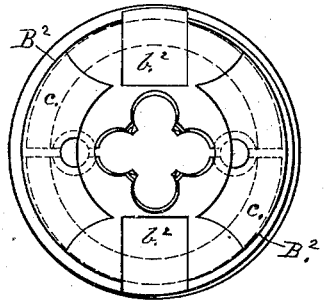

Figure 1 is a plan of the central portion of a screw-cutting plate embodying the elements of this invention; Fig. 2, an elevation from the left of Fig. 1; Fig. 3, an elevation from the right of the portion on the left of the line $xx$ in Fig. 1; Fig. 4, an elevation from below of the portion above the line $yy$ in Fig. 1; Fig. 5, a plan of a portion of the reverse side of the stock detached from Fig. 1, showing an inwardly-projecting finger, ear, or lug, in place; Fig. 6, an elevation from below of Fig. 5; Fig. 7, a plan of the reverse side of the collet-ring detached from Fig. 1; Fig. 8, a plan of the reverse side of the screw-plug or guide-disk detached from Fig. 1, showing the dies in dotted and full lines in place; and Fig. 9, a plan of the dies detached from Fig. 1, being the frustum of a right cone in form.

The screw-cutting plate consists of a stock A, a collet B, and dies C C, having the general form and appearance of the lightning screw-cutting plate well known to the trade; but the elements of my invention will now be clearly set forth.

In the stock A, as shown in the drawings, $a\ a$ designate fingers, ears, or lugs, which project inward from the stock-ring level with its back and in line with the handles, which, for want of space, are broken away. These fingers, ears, or lugs are adapted to fit into the recesses formed in the back of the screw-plug or guide-disk, to be hereinafter described.

Figure 9:
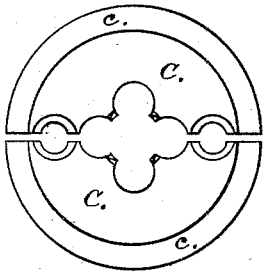

In the collet B B' designates a ring having an outside cylindrical face adapted to fit into the central ring of the stock before mentioned and an inside face or wall consisting of a straight or cylindrical portion $b$, screw-threaded throughout, and of a sloping or conical portion $b'$, narrowing gradually from said cylindrical portion to the upper face of the collet-ring, said conical portion having a perpendicular height a little less than the depth of the dies, yet to be described. Into the cylindrical portion $b$ is fitted a screw-plug or guide-disk $B^2$, having axially through its center the well-known guide-ridges, ribs, or projections, and on either side thereof, in the same diametrical line, the usual screw-threaded orifices, into which are fitted the usual taper-headed or die-adjusting screws. These latter three elements, forming no part of my invention, are not referred to by letter; but in the back of the disk on each side of said guide-opening at diametrically-opposite points are formed recesses $b^2$ $b^2$, adapted to engage the lugs $a\ a$, before mentioned, when the collet is placed in position in the stock, and the upper face of the disk is adapted to receive and hold the base of the dies, yet to be described, when the same are placed in position in the collet. The dies C and C are exact counterparts and have each at the center of its perpendicular diametrical face the usual chasers or screw-cutting ribs or ridges, and on either side thereof the usual semicircular recesses sloping outwardly at the upper ends and adapted throughout to receive the action of the taper-headed screws, before mentioned, whereby said dies are adjusted according to the size of the bolt it is desired to screw-thread. These two elements, being old and forming no part of my invention, are not referred to by letter; but the dies themselves, as shown in the drawings, are provided with outer semi-circumferential sloping peripheral faces $c\ c$, corresponding in degree of inclination with the sloping inner face of the conical portion $b'$ of the collet, before mentioned, thus adapting said dies to fit said conical portion when they are placed in position within said collet. When the dies are placed in position, as shown in Fig. 9, they form the frustum of a right cone, and when placed in position on the plug-screw or guide-disk B² and separated by the taper-headed screws, as shown, they will fill the conical portion $b'$ of the collet-ring, as shown in Figs. 1, 3, and 4, and will be compressed by its conical inner face, accordingly as said screw-plug or guide-disk shall be screwed home. Now the several parts having been placed in position, as indicated in Figs. 1, 3, and 4 of the drawings, it will be readily observed that an effective screw-cutting plate has been constructed, one that is easily manipulated or readily adjusted.

Having now described my invention, it will here be observed that I lay no claims, broadly, to semicircular dies having at their centers screw-cutting chasers and on either side thereof semicircular recesses to receive the action of taper-headed adjusting-screws, but only to such as have outside conical peripheral faces, to taper-headed die-adjusting screws, to the cylindrical collet, nor to the clamp-stock; but

What I do consider new, and desire to secure by Letters Patent, is—

1. In a screw-cutting plate, the semicircular dies C C, having perpendicular diametrical faces, screw-cutting chasers at the center of said faces, semicircular grooves having outwardly-sloping upper ends, one on each side of said chasers, and the outer sloping peripheral faces, substantially as described, and for the purpose set forth.

2. In a screw-cutting plate, the collet B, comprising the cylindrical ring B', having an outside cylindrical face, the inside screw-threaded cylindrical portion $b$, and the upwardly and inwardly sloping conical portion $b'$, and the plug-screw or guide-disk B², screwed into said portion $b$ and having bolt-guide ridges through the center of said disk, screw-threaded orifices on the same diameter, one orifice on each side of said guide-ridges, and the recesses $b^2$ and $b^2$, placed in the back of said disk, all substantially as described, and for the purpose set forth.

3. In a screw-cutting plate, the stock A, having the central clamp-ring closed by a clamp-screw, and the lugs $a$ and $a$, projecting inward from and integral with the side of said clamp-ring, substantially as described, and for the purpose set forth.

In testimony whereof I have hereunto subscribed my name in the presence of two subscribing witnesses.

HENRY B. KEIPER.

Witnesses:
 EDWIN BOOKMYER,
 DANL. H. HERR.